United States Patent Office 3,631,010
Patented Dec. 28, 1971

3,631,010
PROCESS FOR THE PRODUCTION OF TRANS-POLYPENTENAMERS
Josef Witte, Cologne-Stammheim, and Nikolaus Schon and Gottfried Pampus, Leverkusen, Germany, assignors to Farbenfabriken Bayer Aktiengesellschaft, Leverkusen, Germany
No Drawing. Filed May 9, 1969, Ser. No. 826,062
Claims priority, application Germany, May 24, 1968,
P 17 70 491.5
Int. Cl. C08d 3/04; C08f 7/02
U.S. Cl. 260—82.1                                     4 Claims

ABSTRACT OF THE DISCLOSURE

A process for the production of cyclopentene-polymers having predominantly transconfiguration by the polymerisation of cyclopentene in solution in inert solvents in the presence of a mixed catalyst of
(a) a tungsten salt,
(b) a halogenated alcohol in which the halogen atom and the hydroxyl group are attached to adjacent carbon atoms, and/or a halogenated phenol, and
(c) an organic aluminium compound,
in the molar ratio of $a:b:c$ of 1:0.3 to 10:0.5 to 15.

---

Process for the production of trans-polypentenamers

The polymerisation of cyclopentene using organometallic mixed catalysts based on organic aluminium compounds and tungsten salts is known. The cyclopentene undergoes ring opening and is polymerised into linear high molecular weight unsaturated hydrocarbons in which the carbon to carbon double bonds mainly have the trans configuration.

A bulk polymerisation process for cyclopentene which leads to ring openings and the formation of trans polypentenamer has been described in British patent specification 1,010,860. This process, however, has serious disadvantages which make it very difficult to carry out on an industrial scale. The bulk polymerisation produces highly viscous reaction mixtures which make it impossible to control the temperature during polymerisation. Furthermore, only at low conversion of 20 to 50% a processable polymer is obtained. At higher monomer to polymer conversion insoluble cross-linked products which are of no commercial interest are obtained. Furthermore, as will be seen from the examples in the patent specification, very large amounts of catalyst are used and long reaction times are required.

A process for the production of polyalkenamers in which the catalysts used include, inter alia, mixtures comprising a tungsten salt (e.g. $WCl_6$), an oxygen compound which contains an oxygen-oxygen or an oxygen-hydrogen bond and an organic aluminium compound has been described in British patent specification 1,062,367. This process is also preferably carried out without any inert diluent, so that again temperature control becomes impossible owing to very high viscosity of the reaction mixtures formed. In this process, only moderate yields of 30 to 50% were achieved with high catalyst concentrations although within shorter reaction times.

In the described process it is difficult to terminate the polymerisation by inactivating the catalyst due to the high viscosity of the polymerisation mixture. Also removal of catalyst residues and uniform distribution of the stabiliser in the polymer are very difficult on a large industrial scale. If the processes of the above patents are carried out in the presence of inert solvents, e.g. aliphatic or aromatic hydrocarbons, the conversion of cyclopentene into polypentenamer is only 10 to 30%, so that the process becomes technically useless.

A process for the production of cyclopentene-polymers having predominantly trans-configuration has now been found in which cyclopentene is polymerised in solution in inert aliphatic, cycloaliphatic or aromatic hydrocarbons with an organometallic mixed catalyst of (a) a tungsten salt,
(b) a halogenated alcohol in which the halogen atom and the hydroxyl group are on adjacent carbon atoms and/or a halogenated phenol, and
(c) an organic aluminium compound, in a molar ratio of $a:b:c=1.0.3–10:0.5–15$.

The following are examples of suitable catalyst components:

(a) tungsten salts such as $WCl_6$, $WBr_5$ and $WCl_4O$;
(b) halogen-containing alcohols of the general formula:

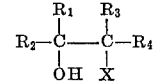

in which

X represents a chlorine, bromine or iodine atom,
$R_1$ and $R_2$ are the same or different and represent a hydrogen atom, or an alkyl, aryl or alkyl-aryl radical,
$R_3$ and $R_4$ are the same or different and represent a chlorine, bromine, iodine or a hydrogen atom, or an alkyl, aryl or alkaryl radical,
and in which $R_1$ and $R_3$ together with the carbon atom to which they are attached may form a 5-membered or larger hydrocarbon ring.

Halogenated phenols which may be used with, or instead of, these compounds are of the general formula:

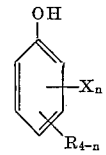

in which X has the meaning given above, R represents an alkyl, aryl or an aromatic radical attached by condensation, and $n$ denotes 1 to 4. Preferred alkyl radicals are those containing 1–6 carbon atoms, aryl radicals those having 6 to 12 carbon atoms as phenyl, naphthyl, biphenyl, alkaryl radicals are preferably alkyl with 1–6 carbon atoms substituted by phenyl.

The following are examples of such cataalyst compounds: 2-chloroethanol, 2-bromoethanol, 2-iodoethanol, 1,3 - dichloropropanol - (2), 2-chlorocyclohexanol, 2-chlorocyclopentanol, o-, m- or p-chlorophenol and o-, m- or p-bromophenol.

(c) Aluminium trialkyls, such as $Al(C_2H_5)_3$, $Al(C_8H_{17})_3$, $Al(C_2H_5)_2Br$ and $Al(C_2H_5)Cl_2$ and aluminum alkoxy- $$Al(C_2H_5)_2Cl$$

$Al(C_2H_5)_2Br$ and $Al(C_2H_5)Cl_2$ and aluminium alkoxy-alkyls such as $Al(C_2H_5)_2OC_2H_5$. Alkyl in this context is preferably alkyl having 1–12 carbon atoms.

Suitable solvents for the process are aliphatic hydrocarbons such as butane, pentane, hexane or iso-octane or cycloaliphatic hydrocarbons such as cyclohexane or aromatic hydrocarbons such as benzene, toluene or xylene. Solutions of cyclopentene containing 5 to 50% in these solvents may be used for the process. Monomer concentrations of 10 to 30% are preferably used.

The process of this invention is suitable for homopolymerising cyclopentene. However, copolymers of cyclopentene may be produced as well. Suitable comonomers, which are used in amounts of up to 30% by weight based on cyclopentene and preferably in amounts of 0.1 to 10% by weight are:

(1) Other cycloolefins, e.g. monocyclic olefins having 4 to 12 carbon atoms as cyclobutene, cycloheptene, cyclooctene, cyclododecene, polycyclic olefins as dicyclopentadiene, norbornene, norbornadiene.
(2) Conjugated diolefins having 4–8 carbon atoms, e.g. butadiene, isoprene, dimethylbutadiene.
(3) α-Olefins having 2–4 carbon atoms such as ethylene, propylene.

The process is usually carried out by adding the catalyst components successively to a solution of the cyclopentene in a suitable solvent and then allowing the polymerisation to proceed. Separate preparation of the catalyst is not necessary. Polymerisation is preferably carried out with the exclusion of air and moisture, e.g. under an atmosphere of an inert gas (nitrogen or argon). The sequence in which the catalyst components are added is not critical but the sequence (a), (b), (c) is preferred. Special modifications of the process are indicated below. The amount of catalyst can vary within wide limits, usually 0.1 to 100 mmols of tungsten, preferably 0.2–10 mmols should be present per mol of cyclopentene.

The temperature during the preparation of the catalyst may be between —60° and +60° C. and is preferably between —20° and +20° C.

If polymerisation is carried out continuously, it may be desirable first to react the tungsten hexachloride in a small portion of the solvent used for polymerisation with the halogenated alcohol or the halogenated phenol because much more highly concentrated solutions of the tungsten compound can be produced in this way. This solution is then added continuously to the stream of solvent and monomer, followed by the organic aluminium compound. After the addition of the organic aluminium compound, polymerisation starts immediately. The polymerisation temperature may be —60° to +60° C. and is preferably —20° to +30° C. The polymerisation time is generally 1 to 5 hours. Conversion rates of cyclopentene to trans-polypentenamer of 80 to 90% or more are obtained by this method. No gel formation occurs even at such high conversion rates.

The molecular weight of the polymers can be adjusted within wide limits by suitable choice of the catalyst components and catalyst composition (molar ratio and sequence of the components). The viscosities ($\eta$) can be adjusted to values of 0.5 to 6.0 dl./g. (at 25° C. in toluene).

Very high molecular weight polypentenamers can be produced completely free from gel by this process with reaction conversions of 70 to 90% even when the cyclopentene which is used is contaminated with other olefines. The products have very valuable technical uses.

When the desired conversion rate is reached, polymerisation can be stopped, e.g. by the addition of alcohols, carboxylic acids and/or amines. Suitable stabilisers and age-resistors which may be added are compounds usually used for rubber, e.g. phenyl-β-naphthylamine, 2,6-ditertiary-butyl-4-methylphenol or 2,2'-dihydroxy-3,3'-ditertiary-butyl-5,5'-dimethyl-diphenylmethane in quantities of 0.2 to 3%.

The polymers can be isolated by precipitation with an alcohol such as methanol, ethanol or isopropanol. In technical processes, it is advantageous to work up the polymer solution by introducing it into hot water. The solvent-water mixture distills off azeotropically and the unreacted monomer is also distilled off. The polymer which is obtained as a lumpy suspension in water, is separated from the water and is dried either in a drying cupboard or on a platform drier or in a screw extruder.

Trans-polypentenamer is a rubbery polymer. It can be cross-linked with the known vulcanisation systems and worked up on rubber processing machines.

The polymers obtained according to the invention and the vulcanisates produced from them have better age resistance. Further, unfilled vulcanisates or vulcanisates which are slightly filled (with unreinforced fillers) can be produced with high grade mechanical properties and excellent elastic properties. Vulcanisates of this type have previously only been obtained from natural rubber or polyisoprene with an extremely high 1,4-cis structure. These products, however, have poorer age resistance than trans-polypentenamer.

EXAMPLE 1

9,000 g. of anhydrous benzene and 2,200 g. of cyclopentene (32.4 mol) are introduced under a nitrogen atmosphere into an autoclave equipped with stirrer. 8 g. of tungsten hexachloride (20.2 mmol) are then added at room temperature (22° C.), and when the tungsten salt has dissolved, 1.62 g. of 2-chloro-ethanol (20.2 mmol) are added with exclusion of oxygen and moisture. The reaction mixture is then cooled to —5° C. and 5.95 g. of aluminium triisobutyl (30 mmol) are added. Polymerisation starts at once. The polymerisation temperature is kept at 0° C. by suitable external cooling. A conversion of 77% is obtained after 3 hours. Polymerisation is then stopped by the addition of a mixture of 10 g. of 2,2'-dihydroxy-3,3'-ditertiary-butyl-5,5'-dimethyl-diphenylmethane, 50 ml. of ethanol and 1,000 ml. of benzene. The stabilised polymer solution in which reaction has been stopped is precipitated with 30 litres of ethanol. The polymer is dried in vacuo at 50° C.

The double bond content is 100% of the theoretical (determined y ICl titration). Trans-double bond content=94.5% (determined from the I.R. spectrum).
Calculation:

$$\text{Percent trans} = \frac{1/10 \cdot E \text{ trans}}{1/10 \cdot E \text{ trans} + 1/6 \ E \text{ cis}} \cdot 100$$

($\eta$) in toluene at 25° C.=3.3
ML-4'100° C.=145

EXAMPLES 2 to 11

The following examples were carried out as described in Example 1. The results are summarised in Table 1. Examples 8, 9, 10 and 11 are comparison tests which show clearly that halogenated alcohols which do not carry the hydroxyl groups and halogen on adjacent carbon atoms or alcohols which are free from halogen are much less effective co-catalysts.

TABLE 1

| | Example Number | | | | | | | | | |
|---|---|---|---|---|---|---|---|---|---|---|
| | 2 | 3 | 4 | 5 | 6 | 7 | 8 | 9 | 10 | 11 |
| Benzene, grams | 800 | 800 | 800 | 800 | 800 | 800 | 800 | 800 | 800 | 800 |
| Cyclopentene, grams | 200 | 200 | 200 | 200 | 200 | 200 | 200 | 200 | 200 | 200 |
| WCl$_6$, grams | 0.8 | 0.8 | 0.8 | 0.8 | 0.8 | 0.8 | 0.8 | 0.8 | 0.8 | 0.8 |
| Cl-CH$_2$-CH$_2$OH, grams | 0.16 | | | | | | | | | |
| Cl-CH$_2$-CHOH-CH$_2$-Cl, grams | | 0.26 | | | | | | | | |
| Cl$_3$C-CH$_2$OH, grams | | | 0.29 | | | | | | | |
| 2-chlorocyclohexanol (OH, Cl on cyclohexane), grams | | | | 0.27 | | | | | | |
| 2-chlorophenol, grams | | | | | 0.25 | | | | | |
| 4-chlorophenol, grams | | | | | | 0.25 | | | | |
| Cl-(CH$_2$)$_4$OH, grams | | | | | | | 0.22 | | | |
| C$_2$H$_5$OH, grams | | | | | | | | 0.092 | | |
| C$_4$H$_9$OH, grams | | | | | | | | | 0.15 | |
| Cl-C$_6$H$_4$-OH (4-chlorophenol cyclohexyl), grams | | | | | | | | | | 0.27 |
| Al(i-C$_4$H$_9$)$_3$, grams | 0.595 | 0.595 | 0.595 | 0.595 | 0.595 | 0.595 | 0.595 | 0.595 | 0.595 | 0.595 |
| Polymerisation time (hr.) | 4 | 4 | 4 | 4 | 4 | 4 | 4 | 4 | 4 | 4 |
| Polymerisation temperature, °C | −5-0 | −5-0 | −5-0 | −5-0 | −5-0 | −5-0 | −5-0 | −5-0 | −5-0 | −5-0 |
| Yield percent | 74 | 77 | 70 | 78 | 71 | 65 | 30 | 17 | 15 | 30 |
| ($\eta$) toluene/25° C | 3.3 | 1.2 | 1.25 | 1.73 | | 4.4 | 2.07 | 4.9 | 4.7 | 2.5 |
| Percent trans | 94 | 92.5 | 91.1 | 92.9 | | 89.7 | 89.2 | 89.7 | 85.0 | 90.1 |
| ML-4′/100° C | 145 | 25 | | 38 | | | | | | |

EXAMPLES 12 to 15

A monomer solution of 600 ml. of benzene and 130 g. of cyclopentene (water content of the solution 4–5 p.p.m.) was prepared in a vessel equipped with stirrer, in each case with the exclusion of nitrogen and moisture. The solution was cooled to 0° C., and 1.3 mmol of tungsten hexachloride was added with stirring and the reaction mixture was stirred for 10 minutes. 2-iodocyclohexanol-(1) was then added in the form of a 10% solution in benzene. The solution was stirred for 5 minutes and cooled to −10° C. When this temperature was reached, Al(i-C$_4$H$_9$)$_3$ was added as the organic aluminium compound. The viscosity of the solution soon started to increase. The temperature was kept at −5° C. for 4 hours. Polymerisation was then stopped by stirring in 0.5% of 2,2′-dihydroxy-3,3′-di-tertiary-butyl - 5,5′ - dimethyl-diphenylmethane and 1.5% of ethanolamine, based on the monomer, in each case dissolved in 20 ml. of ethanol and 80 ml. of benzene. The polymer was precipitated with ethanol, kneaded with ethanol which contained 2,2′-dihydroxy-3,3′-di-tertiary-butyl - 5,5′ - dimethyl-diphenylmethane (0.5%) and dried in vacuo at 50° C. The yields obtained with the catalyst composition and the properties of the polymer are as follows:

| Example | Molar ratio WCl$_6$/(2-iodocyclohexanol)/Al(i-C$_4$H$_9$)$_3$ | | | Yield, percent | Intrinsic viscosity ($\eta$) | Structure (IR) trans, percent |
|---|---|---|---|---|---|---|
| 12 | 1 | 0.75 | 1.5 | 70 | 1.1 | 90.1 |
| 13 | 1 | 1.0 | 1.5 | 77 | 0.9 | 90.5 |
| 14 | 1 | 1.25 | 1.5 | 72 | 1.1 | 88.8 |
| 15 | 1 | 0.75 | 1.25 | 70 | 1.24 | 91.5 |

EXAMPLES 16 to 18

Polymerisation tests were carried out in the same way as in Examples 12 to 14, using 2-bromoethanol-(1) instead of 2-iodocyclohexanol-(1). 2-bromoethanol-(1) was also added as a solution in benzene. The results of the experiments are given in the following table:

| Example | Molar ratio WCl$_6$/BrCH$_2$-CH$_2$OH/Al(i-C$_4$H$_9$)$_3$ | | | Yield, percent | Mooney viscosity ML-4′/100° C | Structure (IR) trans, percent |
|---|---|---|---|---|---|---|
| 16 | 1 | 0.75 | 1.5 | 75 | 80 | 88.9 |
| 17 | 1 | 1.0 | 1.5 | 73 | 73 | 91.5 |
| 18 | 1 | 1.25 | 1.5 | 76 | 71 | 90.4 |

EXAMPLE 19

(a) Reaction of tungsten hexachloride with 2-chloroethanol 250 ml. of benzene and 2.01 g. of chloroethanol (25 mmol) are introduced into a flask equipped with stirrer with the exclusion of oxygen and moisture. 9.9 g. of tungsten hexachloride (25 mmol) are added under nitrogen with vigorous stirring. The resulting hydrogen chloride is removed by passing a slight current of nitrogen through the solution. The tungsten salt goes completely into solution. The solution is 0.1 molar, based on tungsten.

(b) Polymerisation of cyclopentene 800 g. of benzene and 200 g. of cyclopentene are introduced into a glass beaker equipped with stirrer, with the exclusion of water and oxygen. 20 ml. of the solution prepared under (a) (2 mmol) are added under nitrogen at room temperature (25° C.). The solution is cooled to −5° C. 3.0 ml. of a 1 molar solution of aluminium triisobutyl in benzene (3 mmol) are added. Polymerisation starts at once, and can be recognised by a rapid increase in the viscosity of the solution. The reaction temperature is allowed to rise slowly from −5° C. to 0° C. in the course of 1.5 hours. Polymerisation is then stopped by the addition of a solution of 1 g. of 2,2′-dihydroxy-3,3′-di-tertiary-butyl-5,5′-dimethyl-diphenylmethane, 0.31 g. of ethanolamine and 2.0 g. of ethanol in 50 g. of benzene. The polymer is isolated by precipitation with ethanol and dried under vacuum at 50° C.

The amount converted in the course of 3 hours is 185 g., which is 92% of the theoretical; ($\eta$) in toluene at 25° C.:

2.73; ML–4′/100° C.: 94.

Percent trans-double bonds (IR method): 92.5.

EXAMPLE 20

(a) Reaction of tungsten hexachloride and 2-chloroethanol 9.9 g. of $WCl_6$ and 100 ml. of dry toluene are placed in a flask excluding oxygen and moisture. 2.01 g. of chloroethanol dissolved in 22 ml. of toluene are introduced within 60 minutes and with stirring. Resulting hydrogen chloride is removed by nitrogen. A weak stream of nitrogen is passed over the reaction product for three hours. Stirring is continued. The solution thus obtained is 0.2-molar based on tungsten.

(b) Polymerisation 800 g. of toluene and 200 g. of cyclopentene are placed in a flask with exclusion of oxygen and moisture. 4 ml. of the solution described under (a) are added (0.8 mmol) of tungsten). The mixture is cooled to −5° C. and then 1.55 ml. of a 1.0-molar solution of aluminium-diethylmonochloride in toluene is added. In the course of 4 hours the polymerisation temperature is raised to +10° C. The polymerisation is stopped by adding a solution of 1 g. 2,2′ - dihydroxy-3,3′-ditert.-butyl-5,5′-dimethyl-diphenylmethane, 0.5 g. ethanolamine, 2 g. ethanol in 50 ml. of toluene. The polymer is isolated by precipitation with ethanol and dried in vacuo at 50° C. Conversion after 4 hours was 90%. Mooney viscosity ML–4′/100° C.=51. Baader-plasticity (Defo, DIN 53514=250/7 ($\eta$) toluol, 25° C.=2.20. Content of trans double bonds: 92% (IR-method).

EXAMPLE 21

(a) Reaction of tungsten hexachloride and 2-chloroethanol 9.9 g. of $WCl_6$ (25 mmol) and 100 ml. of dry toluene are placed in a flask excluding oxygen and moisture. 4.02 g. of 2-chloroethanol (50 mmol) dissolved in 21 ml. of dry toluene are introduced with stirring within 60 minutes. Resulting hydrogenchloride is removed by passing a slight current of nitrogen through the solution. Stirring is continued for three to four hours. The solution thus obtained is 0.2 molar based on tungsten.

(b) Copolymerisation of cyclopentene and norbornadiene 800 g. of toluene, 2 g. of norbornadiene and 200 g. of cyclopentene are placed in a flask with exclusion of oxygen and moisture. 4 ml. of the solution prepared under (a) are added under nitrogen at room temperature (25° C.). The solution is cooled to −5° C. 1.8 ml. of a 1 molar solution of $Al(C_2H_5)_2Cl$ in toluene are added. Polymerisation starts at once and can be recognised by a rapid increase in the viscosity of the solution. The reaction temperature is allowed to rise slowly from −5° C. to +10° C. in the course of 3 hours. Polymerisation is then stopped by addition of a solution of 1 g. of 2,2′ - dihydroxy-3,3′-di-tert.-butyl-5,5′-dimethyl-diphenylmethane, 0.31 g. of ethanolamine and 2.0 g. of ethanol in 50 g. of toluene. The polymer is isolated by precipitation with ethanol and dried in vacuum at 50° C. The conversion of monomer to polymer is 85%, Mooney-viscosity ML–4′/100° C.=93, Baader-plasticity (Defo, DIN 53514)=1175/32 ($\eta$) toluol, 25° C.=2.82.

We claim:

1. A process for producing cyclopentene polymers which comprises dissolving cyclopentene and 0 to 30% by weight, based on the cyclopentene, of a monomer selected from the group consisting of monocyclic olefins having 4 to 12 carbon atoms polycyclic olefins, conjugated diolefins having 4 to 8 carbon atoms and α-olefins having 2 to 4 carbon atoms in an inert solvent, contacting resulting solution with a catalyst system comprising (a) a tungsten salt, (b) a compound selected from the group consisting of 2-chlorocyclohexanol, 2-chlorocyclopentanol and the compound of the formula

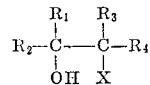

wherein X is chlorine, bromine or iodine, $R_1$ and $R_2$ are hydrogen, alkyl, aryl or alkaryl and $R_3$ and $R_4$ are hydrogen, chlorine, bromine, iodine, alkyl, aryl or alkaryl and (c) aluminum trialkyl, aluminum halogen alkyl or aluminum alkoxyalkyl wherein alkyl has 1 to 12 carbon atoms, in the molar ratio of $a:b:c$ of $1:0.3–10:0.5–15$ at a temperature of between −60 and 60° C. and recovering resulting polymer.

2. The process of claim 1 wherein (a) is $WCl_6$, $WBr_6$ or $WCl_4O$.

3. The process of claim 1 wherein (c) is aluminum-trialkyl containing 1 to 12 carbon atoms.

4. A cyclopentene polymerization catalyst comprising (a) a tungsten salt, (b) compounds selected from the group consisting of 2-chlorocyclohexanol, 2-chlorocyclopentanol and the compound of the formula

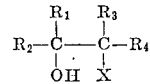

wherein X is chlorine, bromine or iodine, $R_1$ and $R_2$ are hydrogen, alkyl, aryl or alkaryl and $R_3$ and $R_4$ are hydrogen, chlorine, bromine, iodine, alkyl, aryl or alkaryl and (c) aluminum-trialkyl, aluminum halogen alkyl or aluminum alkoxyalkyl wherein alkyl has 1 to 12 carbon atoms, in the molar ratio of $a:b:c$ of $1:0.3–10:0.5–15$.

References Cited

UNITED STATES PATENTS

| | | | |
|---|---|---|---|
| 3,026,269 | 3/1962 | Gresham et al. | 252—429 |
| 3,150,122 | 9/1964 | Andersen et al. | 260—94.9 |
| 3,449,310 | 6/1969 | Dall'Asta et al. | 260—93.1 |
| 3,458,489 | 7/1969 | Natta et al. | 260—93.1 |
| 3,459,725 | 8/1969 | Natta et al. | 260—93.1 |
| 3,492,278 | 1/1970 | Uraneck et al. | 260—93.1 |
| 3,492,245 | 1/1970 | Calderon et al. | 252—429 |

JOSEPH L. SCHOFER, Primary Examiner

R. A. GAITHER, Assistant Examiner

U.S. Cl. X.R.

252—429 B; 260—88.2 B, 88.2 D, 88.2 E, 93.1